(12) United States Patent
Brink et al.

(10) Patent No.: US 9,463,609 B2
(45) Date of Patent: Oct. 11, 2016

(54) PROCESS FOR PRODUCING MULTILAYER BLOWN FILM AND FILM OBTAINED BY THE PROCESS

(71) Applicant: DSM IP ASSETS B.V., Heerlen (NL)

(72) Inventors: Ted Brink, Echt (NL); Alexander Antonius Marie Stroeks, Echt (NL); Katarina Tomic, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/652,628

(22) PCT Filed: Dec. 19, 2013

(86) PCT No.: PCT/EP2013/077468
§ 371 (c)(1),
(2) Date: Jun. 16, 2015

(87) PCT Pub. No.: WO2014/096241
PCT Pub. Date: Jun. 26, 2014

(65) Prior Publication Data
US 2015/0337093 A1 Nov. 26, 2015

(30) Foreign Application Priority Data

Dec. 20, 2012 (EP) .................................. 12198591

(51) Int. Cl.
| | |
|---|---|
| *C08J 5/18* | (2006.01) |
| *B29C 47/06* | (2006.01) |
| *B32B 27/32* | (2006.01) |
| *B32B 27/34* | (2006.01) |
| *B29C 47/00* | (2006.01) |
| *B32B 7/12* | (2006.01) |
| *B32B 27/08* | (2006.01) |
| *C08G 69/14* | (2006.01) |
| *B29K 23/00* | (2006.01) |
| *B29K 77/00* | (2006.01) |

(52) U.S. Cl.
CPC ........... *B32B 27/34* (2013.01); *B29C 47/0004* (2013.01); *B29C 47/0026* (2013.01); *B29C 47/06* (2013.01); *B32B 7/12* (2013.01); *B32B 27/08* (2013.01); *B32B 27/32* (2013.01); *B32B 27/327* (2013.01); *C08J 5/18* (2013.01); *B29K 2023/00* (2013.01); *B29K 2077/00* (2013.01); *B32B 2270/00* (2013.01); *B32B 2307/734* (2013.01); *B32B 2435/00* (2013.01); *B32B 2439/46* (2013.01); *C08J 2323/06* (2013.01); *C08J 2323/12* (2013.01); *C08J 2377/02* (2013.01); *C08J 2423/06* (2013.01); *C08J 2423/12* (2013.01); *C08J 2477/02* (2013.01)

(58) Field of Classification Search
CPC ....... B32B 27/32; B32B 27/34; B29C 47/06; B29C 47/0004; C08J 5/18
See application file for complete search history.

(56) References Cited

U.S. PATENT DOCUMENTS 3,983,306 A * 9/1976 Nielinger ................ B32B 27/00
206/484

FOREIGN PATENT DOCUMENTS

| WO | WO 97/47468 | 12/1997 |
| WO | WO 03/086757 | 10/2003 |

OTHER PUBLICATIONS

International Search Report for PC/EP2013/077468, mailed Mar. 27, 2014, 3 pages.

\* cited by examiner

*Primary Examiner* — Fred M Teskin
(74) *Attorney, Agent, or Firm* — Nixon & Vanderhye P.C.

(57) ABSTRACT

Process for producing by blown film process a multilayer film containing at least one copolyamide layer and at least one polyolefin layer, in which the copolyamide comprises monomeric units of: •aliphatic non-cyclic diamines X and aliphatic non-cyclic dicarboxylic acids Y or aliphatic non-cyclic α,ω-amino acids Z, and •diamines M and diacids N in an amount between 0.1 to 2 wt % based on the total amount of copolyamide, and in which M and N are cyclic. The invention also relates to a multilayer blown film containing at least one copolyamide layer and at least one polyolefin layer, in which the copolyamide comprises monomeric units of: •aliphatic non-cyclic diamines X and aliphatic non-cyclic dicarboxylic acids Y or aliphatic non-cyclic α,ω-amino acids Z, and •diamines M and diacids N in an amount between 0.1 to 2 wt % based on the total amount of copolyamide, and in which M and N are cyclic.

15 Claims, No Drawings

PROCESS FOR PRODUCING MULTILAYER BLOWN FILM AND FILM OBTAINED BY THE PROCESS

This application is the U.S. national phase of International Application No. PCT/EP2013/077468 filed 19 Dec. 2013, which designated the U.S. and claims priority to EP Patent Application No. 12198591.5 filed 20 Dec. 2012, the entire contents of each of which are hereby incorporated by reference.

The invention relates to a process for producing by blown film process a multilayer film containing at least one copolyamide (coPA) layer and at least one polyolefin layer. The invention also relates to a multilayer blown film containing at least one copolyamide layer. Such a process is often used for producing for example agricultural film and packaging film for, for example, foodstuffs. The polyolefin layer imparts to the film certain properties such as high tear strength when linear low-density polyethylene (LLDPE) is used as polyolefin or good surface gloss when polypropylene is used as polyolefin, whilst as a rule the polyamide layer is intended to impart barrier properties to the film.

A problem of the known process is that combinations of polyamide layers and polyolefin layers, that in themselves are sufficient to impart a desired combination of properties to the film, often are difficult to process by a blown film process. A suitable setting of the blown film device proves difficult to find, and in addition such setting must be maintained within narrow limits. This renders the process difficult and little flexible, particularly in terms of production rate and blow-up ratio. By employing a copolyamide instead of a polyamide, the processing can be improved. However, then the barrier properties of the film are compromised, especially at higher humidities. This renders the multilayer films less suitable for applications in for example food packaging or medical packaging.

The invention aims to provide a process for preparing blown film by blown film process which shows higher speeds for production, as well as providing a multilayer blown film with sufficient barrier properties.

This aim is achieved by the process according to the invention by a process for producing by blown film process a multilayer film containing at least one copolyamide layer and at least one polyolefin layer, wherein the copolyamide comprises monomeric units of:
- aliphatic non-cyclic diamines X and aliphatic non-cyclic dicarboxylic acids Y or aliphatic non-cyclic α,ω-amino acids Z, and
- diamines M and diacids N in an amount between 0.1 to 2 wt % based on the total amount of copolyamide, and in which M and N are cyclic.

It has been found that a film bubble containing the mentioned layers possesses better stability and can be blown at a higher throughput with the copolyamide. Due to the presence of the copolyamide, even in combination with for example LLDPE and polypropylene (PP), that are known for poor bubble stability, bubble stability is higher with that of the combination of polyamide-6 with low-density polyethylene (LDPE). Surprisingly, the barrier properties also remain high, especially at higher humidity. Blown film process, including blown film process of multilayer films, is a process known per se that may be applied in its known embodiments in the process according to the invention, which process does not impose any special requirements therefor.

Copolyamides are known and generally described in Nylon Plastics Handbook, Edited by Melvin I. Kohan, Hanser Publishers, 1995, pages 365 and further.

The nomenclature is adhered to as used in Nylon Plastics Handbook, Edited by Melvin I. Kohan, Hanser Publishers, 1995; e.g. PA-612 denotes a homopolymer with building blocks hexane-1,6-diamine and 1,12-dodecanoic acid, PA-6/12 denotes a copolymer made from ε-caprolactam and laurolactam and a blend of PA-6 and PA-12 is described as PA-6/PA-12.

Polyamide homopolymers can for example be made from a diamine (X) and a diacid (Y) and are generally known as an AABB type polyamide, e.g. PA-612 denotes a homopolymer with building blocks hexane-1,6-diamine (HMDA) and 1,12-dodecanoic acid. Polyamide homopolymers can also be made from an amino acid (Z) are generally known as AB-type polyamide, e.g. PA-6 denotes a homopolymer from ε-caprolactam.

A copolyamide is usually described as either PA-XY/MN, wherein PA-XY is a AABB type polyamide, or PA-Z/MN, wherein PA-Z is an AB-type polyamide and wherein M and N are present in lower amounts than the first mentioned monomeric units. This notation is silent about the type of copolyamide. The copolyamide can thus be random, block or even alternating.

A blown film process is known per se, and is for example described in in Nylon Plastics Handbook, Edited by Melvin I. Kohan, Hanser Publishers, 1995, pages 228, 229. Specific blown film processes suitable to carry out the process according to the invention include for example double bubble, triple bubble and blown film process in which the bubble is cooled by water.

Aliphatic Non-Cyclic Monomeric Units X, Y and Z

The copolyamide in the process according to the invention comprises aliphatic non-cyclic diamines X and aliphatic non-cyclic dicarboxylic acids Y or aliphatic non-cyclic α,ω-amino acids Z.

Preferably the sum of X+Y is at least 70 wt % with respect to the total amount of copolyamide or at least 70 wt % of Z, more preferably the sum of X+Y or Z is at least 80 wt %, even more preferred at least 90 wt %. The term non-cyclic denotes a structure wherein no ring of atoms is present. Weight percentages are denoted with respect to the total amount of copolyamide, unless denoted otherwise.

The aliphatic non-cyclic monomeric units can either be of the AB-type, thus having at least one amine group and at least one acid group, also denoted as aminoacid and herein referred to as Z. Examples of AB-type aliphatic non-cyclic monomeric units are epsilon-caprolactam, aminodecanoic acid, aminoundecanoic acid and aminododecanoic acid.

The aliphatic non-cyclic monomeric units can also be diamines and diacids, thus of the AA and BB type, herein denoted as X and Y. Examples of aliphatic non-cyclic diamines X include 1,4-diaminobutane, 1,5-diaminopentane, 1,6-diaminohexane. Examples of aliphatic non-cyclic diacids Y include 1,6-hexanedioic acid, 1,8-octanedioic acid, 1,9-nonanedioic acid, 1,10-decanedioic acid, undecandioic acid, 1,12-dodecanedioic acid, 1,13-tridecanedioic acid, 1,14-tetradecanedioic acid, 1,15-heptadecanedioic acid, 1,16-hexadecanedioic acid, 1,17-septadecanedioic acid and 1,18-octadecandioic acid.

Preferably the molar ratio X:Y is between 1.1:1 and 1:1.1. Preferably, the aliphatic non-cyclic monomeric units are
 i. ε-caprolactam for Z or
 ii. 1,6-diaminohexane for X and 1,6-hexanedioic acid for Y, as these aliphatic non-cyclic monomeric units are readily available.

The aliphatic non-cyclic monomeric units can also be a mixture of AB-type and AA-type and BB-type monomers. Although ε-caprolactam itself is cyclic, upon incorporation into the copolyamide, the monomeric unit is no longer cyclic.

The invention also relates to a multilayer blown film containing at least one layer of copolyamide as described above and at least one polyolefin layer.

Embodiment Where X is 1,4-diaminobutane

In another embodiment the copolyamide in the process according to the invention comprises monomeric units of X being 1,4-diaminobutane, and Y being an aliphatic non-cyclic dicarboxylic acid with at least 8 carbon atoms. Preferably the monomeric unit of aliphatic non-cyclic dicarboxylic acid Y has at most 18 carbon atoms. More preferably the monomeric unit of aliphatic non-cyclic dicarboxylic acid Y is chosen from the group of 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid and 1,18-octadecanedioic acid. Even more preferably the monomeric unit of aliphatic non-cyclic dicarboxylic acid has an even number of carbon atoms, as this results in a relatively higher melting point of the copolyamide. Most preferred, the monomeric unit of aliphatic linear dicarboxylic acid is 1,10-decanedioic acid. The invention also relates to a multilayer blown film containing at least one layer of copolyamide and at least one polyolefin layer, in which X and Y are chosen as described above.

Monomeric Units of Diamines M and Diacids N

The copolyamide in the process according to the invention comprises diamines M and diacids N in a total amount between 0.1 to 2 wt % based on the total amount of copolyamide and in which M and N are cyclic.

Surprisingly it has been shown that already these amounts exhibit a higher blow-up ratio which allows higher production speeds, while maintaining the barrier properties. Preferably, the total amount of M+N is less than 1.9 wt %, more preferably less than 1.8 wt %, even more preferably less than 1.5 wt %. The total amount of M+N is at least 0.1 wt %, more preferably at least 0.2 wt %, even more preferably at least 0.5 wt %. Most preferred the sum is between 0.2 and 1.5 wt %. Preferably, the molar ratio M:N is between 2:1 and 1:2, more preferably between 1.2:1 and 1:1.2.

Cyclic diamines M include aromatic and non-aromatic diamines such as for example diaminocylohexane, isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, 3,6-bis(aminomethyl)norbornane.

Cyclic diacids N include aromatic diacids such as isophthalic acid (I), terephthalic acid (T), 4-methylisophthalic acid, 4-tert-butylisophthalic acid, 1,4-naphthalenedicarboxylic acid and 2,6-naphthalenedicarboxylic acid. Cyclic diacids N also include non-aromatic cyclic diacids such as cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

Preferably, the cyclic diacids N are aromatic diacids. More preferably, the cyclic diacids N are isophthalic acid and/or terephthalic acid.

Most preferred the cyclic diamine M is isophoronediamine and the cyclic diacid N is terephthalic acid.

Most preferred, the aliphatic non-cyclic monomeric units are
 i. ε-caprolactam for Z or
 ii. 1,6-diaminohexane for X and 1,6-hexanedioic acid for Y,
and M is isophoronediamine (IPD) and N is terephthalic acid (T) in an amount between 0.1 and 2 wt % based on the total amount of the copolyamide.

The copolyamide can comprise the usual additives such as branching agents, branched monomeric units, endcappers as well as other monomeric units, different from X, Y or Z.

The process according to the invention produces a multilayer film with at least one copolyamide layer, but also multiple copolyamide layers may be present.

As material in a polyolefin layer use is made of the known polyolefins, in particular homopolymers of ethylene and copolymers thereof with one or more α-olefins and homopolymers of propylene and copolymers thereof with one or more α-olefins, in particular ethylene. Suitable polyeolefins include LDPE, LLDPE, polypropylene and blends thereof. Particularly, blends of LLDPE and LDPE are used in amounts of 70 wt % LLDPE and 30 wt % LDPE.

The process according to the invention is also suitable for producing multilayer films in which more than one polyolefin layer is present. Optionally, an inner layer can comprise metallocene PE or inomoers to facilitate welding of the film.

As a rule, in the process according to the invention a copolyamide layer preferably is adjacent to a polyolefin layer. Application of a copolyamide layer and a polyolefin layer as adjacent functional layers directly connected to each other or connected by an tie layer has been found to yield the highest bubble stability. The layers may thus be directly adjacent to each other but a tie layer may also be present between the layers. Examples of suitable materials for these tie layers are so-called tie resins. Tie resins include modified polyolefins, such as LDPE, LLDPE, metallocene PE, polyethylene-vinyl alcohol, polyethylene-acrylic acid, polyethylene-methacrylic acid and polypropylene, that are grafted with at least one compound chosen from the group of α,β-unsaturated dicarboxylic acids, for example maleic acid, fumaric acid and itaconic acid and anhydrides, acidic esters, acidic imides and acidic imines thereof. Modified copolymers of ethylene and the aforementioned dicarboxylic acids may also be applied as tie resin.

If the layers are directly adjacent to each other, the polyolefin layer preferably consists of a mixture of a polyolefin and a tie-resin.

A copolyamide layer may also be adjacent to a polyolefin layer on two sides, for example an LLDPE layer, and the other way round. The formed film then contains for example a coPA-LLDPE-coPA or LLDPE-coPA-LLDPE sandwich structure.

Besides the mentioned layers, one or more other functional layers may also be applied. Layers often used in multilayer film are those which consist of for example ethylene-vinylalcohol and ionomers.

The total thickness of multilayer films that are produced in practice by blown film process and also by the process according to the invention is between 20 and 300 μm. In the process according to the invention a polyolefin layer in the multilayer film preferably has a thickness of at least 10 μm. The upper limit of the thickness is given by the intended application and the properties required therefor and extends in practice to approx. 200 μm. A copolyamide layer usually has a thickness of at least 2 μm and preferably of at least 20% of the thickness of a polyolefin layer, up to a maximum of 150 μm, preferably 100 μm. Any other layers present have such thicknesses that they are able to perform their intended function during the production process or in the multilayer film to be formed. For example a tie layer may have a thickness similar to a copolyamide layer.

The blow-up ratios applied in the process according to the invention prove to be able to be chosen higher than when the conventional polyamide-6 is applied.

The process according to the invention allows the preparation for multilayer films excellently suitable for packaging of foods and medicals or other applications in which high humidity is present.

The invention is elucidated with reference to the following example and comparative experiments.

The invention also relates to a multilayer blown film containing at least one copolyamide layer and at least one polyolefin layer, characterized in that the copolyamide is employed comprising monomeric units of:

aliphatic non-cyclic diamines X and aliphatic non-cyclic dicarboxylic acids Y or aliphatic non-cyclic α,ω-amino acids Z, and diamines M and diacids N in a total amount between 0.1 to 2 wt % based on the total amount of copolyamide, and in which M and N are cyclic.

Preferably, the multilayer blown film contains at least one polyolefin layer comprising LLDPE, LDPE or polypropylene or a mixture thereof, more preferably at least one polyolefin layer consists essentially of polypropylene.

In another embodiment, in the multilayer blown film N is chosen from the group of isophthalic acid (I), terephthalic acid (T), 4-methylisophthalic acid, 4-tert-butylisophthalic acid, 1,4-naphthalenedicarboxylic acid and 2,6-naphthalenedicarboxylic acid.

In yet another embodiment, in the multilayer blown film wherein M is chosen from the group of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane.

In a preferred embodiment, the multilayer blown film is containing at least one copolyamide layer and at least one polyolefin layer, wherein the copolyamide is built from monomeric units of:

aliphatic non-cyclic diamines X and aliphatic non-cyclic dicarboxylic acids Y or aliphatic non-cyclic α,ω-amino acids Z, and wherein X is chosen from the group of 1,4-diaminobutane, diaminopentane, hexamethylene diamine, and Y is chosen from the group of 1,6-hexanedioic acid, 1,8-octanedioic acid, 1,9-nonanedioic acid, 1,10-decanedioic acid, undecandioic acid, 1,12-dodecanedioic acid, or Z is chosen from the group of ε-caprolactam, aminodecanoic acid, aminoundecanoic acid and aminododecanoic acid, and diamines M and diacids N in a total amount between 0.1 to 2 wt % based on the total amount of copolyamide, and in which M and N are cyclic, wherein M is chosen from the group of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane, and N is chosen from the group of isophthalic acid (I), terephthalic acid (T), 4-methylisophthalic acid, 4-tert-butylisophthalic acid, 1,4-naphthalenedicarboxylic acid and 2,6-naphthalenedicarboxylic acid, cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

The multilayer blown film according to the invention can suitably be used in applications such as lidding, thermoforming, shrink and vacuum bags, and as a pouch. Preferably, the multilayer blown film is employed as lidding and thermoforming film as exceeded stretch ratios can be achieved, in comparison multilayer films containing at least one layer of homo-polyamide.

EXAMPLES

Experiments were conducted on a 7-layer film.

A 7-layer Varex machine was used on which a film was produced with a total thickness of 100 micron. The film structure was as follows:

27 micron LDPE (LD150BW of Exxon Mobil) MFI 0.75
8 micron Yparex 9601 tie resin, MFI 1.3
12 micron (co)polyamide
6 micron Yparex 9601, tie resin
12 micron (co)polyamide
8 micron Yparex 9601, tie resin
27 micron LDPE (LD150BW)

The total output of the machine amounted to approximately 400 kg/hr. The haul-off speed was approximately 25 m/min, but was adapted to compensate for the changes in blow-up ratio. The die gap of the die was 1.25 mm on the inside, 2.25 mm on the outside.

Temperature Settings:
PE extruders: 170-180-180-180-180° C.; grooved section 50° C.
Tie resin extruders: 200-210-210-210-210° C.; grooved section 50° C.
(co)PA extruders: 250-255-255-255-255° C.; grooved section 170° C.
Die: 250° C. Monolip cooling ring The blow-up ratio (BUR) was increased to a level where wrinkles occurred. Wrinkles are not desired, but the BUR is advantageously as high as possible without appearance of wrinkles to have maximum output.

Comparative Example A

One film was prepared in which the (co)polyamide was polyamide-6 (Akulon F136-E2). The initial BUR was 2.5. This was stepwise increased to 2.55 and 2.60/2.65. Up to 2.5, no wrinkles were visible. At a BUR of 2.6 some wrinkles could be observed which became unacceptable at a BUR of 2.65.

Conclusion: the process is stable up to a BUR of 2.55 with a lay flat width of 1400 mm.

Example 1 According to the Invention

Films were prepared according to the specification above in which the (co)polyamide was copolyamide PA6/IPDT with an amount of IPDT of 1 wt % (Akulon XS136-E2), thus Z was ε-caprolactam, M was isophoronediamine and N was terephthalic acid. M+N was 1 wt %. No difference in film transparency could be observed compared to the film of Comparative Example A.

No wrinkles were visible at a BUR of 2.65. Subsequently, the BUR was increased to 2.73 and later to 2.8. At a BUR of 2.8, incidentally, wrinkles were visible. Stable films could be obtained with 1400 mm lay flat width as well with 1550 mm lay flat width.

The process is stable up to a BUR of 2.73 with a lay flat width of 1550 mm.

Example 1 clearly shows that a much higher blow-up ratio could be attained (2.73 instead of 2.55), as well as a much higher lay flat width (1500 mm versus 1400 mm). The process according to the invention thus allows about 7% more film production by employing the particular copolyamide.

Permeation data were measured on the films obtained above and described below on a Mocon Ox-tran 2/21 device according to ASTM D3985 at a temperature of 23° C. with testgas 100% $O_2$ and a sample area of 50 $cm^2$ at relative humidities of 0% and 85%. For some films, also at a humidity of 50% was measured. The results are shown in table 1 and table 2.

TABLE 1

Permeation data

| Example | Material of (co)polyamide layer | Relative humidity [%] | Permeation cc*mm/(m2*day) |
|---|---|---|---|
| Example 1 1400 mm lay flat width | PA6/IPDT | 0 | 3.6 |
|  |  | 85 | 5.4 |
| Example 1 1550 mm lay flat width | PA6/IPDT | 0 | 3.6 |
|  |  | 85 | 5.6 |
| Comparative A; 1400 mm lay flat width | PA6 | 0 | 3.3 |
|  |  | 85 | 5.5 |

The results in Table 1 clearly show that with the process according to the invention permeation results can be obtained in the same order as for polyamide-6. Especially permeation at high relative humidity shows good results as these remain rather low, which shows low amounts of gas being able to permeate through the film.

The examples thus show that with the process according to the invention more film can be made with a higher lay flat width while keeping the barrier properties at the same level of polyamide-6.

Another experiment was performed in which two 7-layer blown films were prepared.
The film structure was as follows:
A. seal layer consisting of a blend of metallocene, LDPE and anti-blocking (AB) masterbatch
B. tie layer
C.—see text
D.—see text
E. tie layer
F. PP random copolymer
G. PP random copolymer+AB-masterbatch In one film, example 2, a copolyamide was used for layers C and D. The copolyamide was PA6/IPDT which contained 1 wt % IPDT based on the total amount of copolaymide. This film was compared to a film in which layers C and D consisted out of a blend of 90 wt % PA6 and 10 wt % of an amorphous polyamide (Selar 3426): comparative example B.

The total film thickness was 60 micron, layers C and D were in total 18 micron.

The temperature of the extruders for layers C and D was 240° C., as was the die temperature.

The blow up ratio (BUR) was 2.8.

After process stabilization, it was observed that the process was running smoothly; with the process according to the invention, example 2, the bubble stability was as good as comparative example B. This is surprising as in example 2 a much lower amount of cyclic diamines and cyclic diacids was present compared to the 10 wt % amorphous material in comparative example B. Surprisingly, example 2 showed less wrinkles in the finished film compared to comparative example B.

TABLE 2

Permeation results

| Example | Material of (co)polyamide layer | Relative humidity [%] | Permeation cc*mm/(m2*day) |
|---|---|---|---|
| Example 2 | PA6/IPDT | 0 | 3.4 |
|  |  | 50 | 2.0 |
|  |  | 85 | 4.6 |
| Comparative B; | PA6 + 10 wt % amorphous PA | 0 | 3.4 |
|  |  | 50 | 1.7 |
|  |  | 85 | 3.9 |

The results in Table 2 clearly indicate that with a film according to the invention and a process according to the invention similar permeation results could be obtained, especially at lower humidity levels. This is surprising as the reference contained a blend of 10 wt % of amorphous polyamide, while in Example 2 only 1 wt % of IPDT was present in the copolyamide.

The invention claimed is:

1. A process for producing by blown film process a multilayer film containing at least one copolyamide layer and at least one polyolefin layer, wherein a copolyamide is employed comprising monomeric units of:
   (i) aliphatic non-cyclic diamines X and aliphatic non-cyclic dicarboxylic acids Y or aliphatic non-cyclic α,ω-amino acids Z, and
   (ii) cyclic diamines M and cyclic diacids N in a total amount between 0.1 and less than 1.8 wt % based on the total amount of copolyamide.

2. The process according to claim 1, wherein at least one polyolefin layer comprises linear low-density polyethylene (LLDPE), low-density polyethylene (LDPE) or polypropylene or a mixture thereof.

3. The process according to claim 2, wherein at least one polyolefin layer is a mixture of LLDPE and LDPE.

4. The process according to claim 1, wherein at least one polyolefin layer consists essentially of polypropylene.

5. The process according to claim 1, which comprises providing a tie layer between at least one copolyamide layer and at least one polyolefin layer.

6. The process according to claim 1, wherein the cyclic diacids N are selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid.

7. The process according to claim 1, wherein the cyclic diamines M are selected from the group consisting of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl) norbornane.

8. The process according to claim 1, wherein
the cyclic diamines M are selected from the group consisting of isophoronediamine (IPD), bis-(p-aminocyclohexane)methane (PACM), 2,2-Di-(4-aminocyclohexyl)-propane, 3,3'-dimethyl-4-4'- diaminodicyclohexylmethane, p-xylylenediamine, m-xylylenediamine, and 3,6-bis(aminomethyl)norbornane, and wherein the cyclic diacids N are selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid, -cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

9. The process according to claim 1, wherein the aliphatic non-cyclic α,ω-amino acids Z are selected from the group consisting of ε-caprolactam, aminodecanoic acid, aminoundecanoic acid and aminododecanoic acid.

10. The process according to claim 1, wherein the aliphatic non-cyclic diamines X are selected from the group consisting of 1,4-diaminobutane, diaminopentane and hexamethylene diamine.

11. The process according to claim 1, wherein the aliphatic non-cyclic dicarboxylic acids Y are selected from the group consisting of 1,6-hexanedioic acid, 1,8-octanedioic acid, 1,9-nonanedioic acid, 1,10-decanedioic acid, undecandioic acid and 1,12-dodecanedioic acid.

12. The process according to claim 1 wherein the cyclic diamines M and the cyclic diacids N are present in a total amount between 0.2 to 1.5 wt % based on the total amount of copolyamide.

13. The process according to claim 1, wherein the monomeric units of the cyclic diamines M are units of isophorone diamine and the monomeric units of the cyclic diacids N are units of terephthalic acid.

14. A multilayer blown film, comprising at least one copolyamide layer and at least one polyolefin layer, wherein the at least one copolyamide layer comprises a copolyamide comprising monomeric units of:

(i) aliphatic non-cyclic diamines X and aliphatic non-cyclic dicarboxylic acids Y or aliphatic non-cyclic α,ω-amino acids Z, and (ii) cyclic diamines M and cyclic diacids N in a total amount between 0.1 and less than 1.8 wt % based on the total amount of copolyamide.

15. The multilayer blown film according to claim 14, wherein the aliphatic non-cyclic diamines X are selected from the group consisting of 1,4-diaminobutane, diaminopentane, hexamethylene diamine, and wherein the aliphatic non-cyclic dicarboxylic acids Y are selected from the group consisting of 1,6-hexanedioic acid, 1,8-octanedioic acid, 1,9-nonanedioic acid, 1,10-decanedioic acid, undecandioic acid and 1,12-dodecanedioic acid, or the aliphatic non-cyclic α,ω-amino acids Z are selected from the group consisting of ε-caprolactam, aminodecanoic acid, aminoundecanoic acid and aminododecanoic acid, and wherein the cyclic diamines M are selected from the group consisting of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane, and the cyclic diacids N are selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid, cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

* * * * *